United States Patent
Jones

[15] 3,673,775
[45] July 4, 1972

[54] SELF-PROPELLED AGRICULTURAL MACHINE

[72] Inventor: Frank D. Lloyd Jones, Moline, Ill.
[73] Assignee: Deere & Company, Moline, Ill.
[22] Filed: Oct. 23, 1970
[21] Appl. No.: 83,434

[52] U.S. Cl. ..................................56/14.7, 56/2, 56/DIG. 9, 56/105
[51] Int. Cl. ........................................A01d 45/02
[58] Field of Search..................56/14.7, 13.5, 2, 3, 10.1, 56/16.4, 16.7, DIG. 9; 37/110; 180/25 R

[56] References Cited

UNITED STATES PATENTS

| 2,284,909 | 6/1942 | Kuhlman | 56/14.7 |
| 2,484,999 | 10/1949 | Hyman | 56/105 |
| 2,560,801 | 7/1951 | Kuhlman | 56/106 |
| 3,035,384 | 5/1962 | Mitchell | 56/DIG. 9 |
| 2,791,043 | 5/1957 | Hancock | 37/110 |

*Primary Examiner*—Antonio F. Guida
*Attorney*—H. Vincent Harsha, Harold M. Knoth, William A. Murray, Raymond L. Hollister and John M. Nolan

[57] ABSTRACT

A self-propelled machine in which the basic frame comprises a two-wheeled rear traction section and a front arched or "gooseneck" section supported on steerable wheel means and capable of mounting a variety of crop-handling and harvesting means.

9 Claims, 7 Drawing Figures

INVENTOR.
F. D. L. JONES

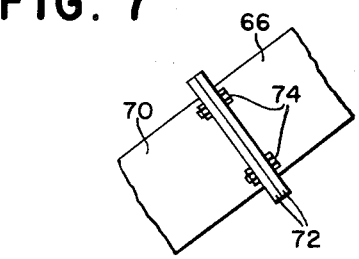
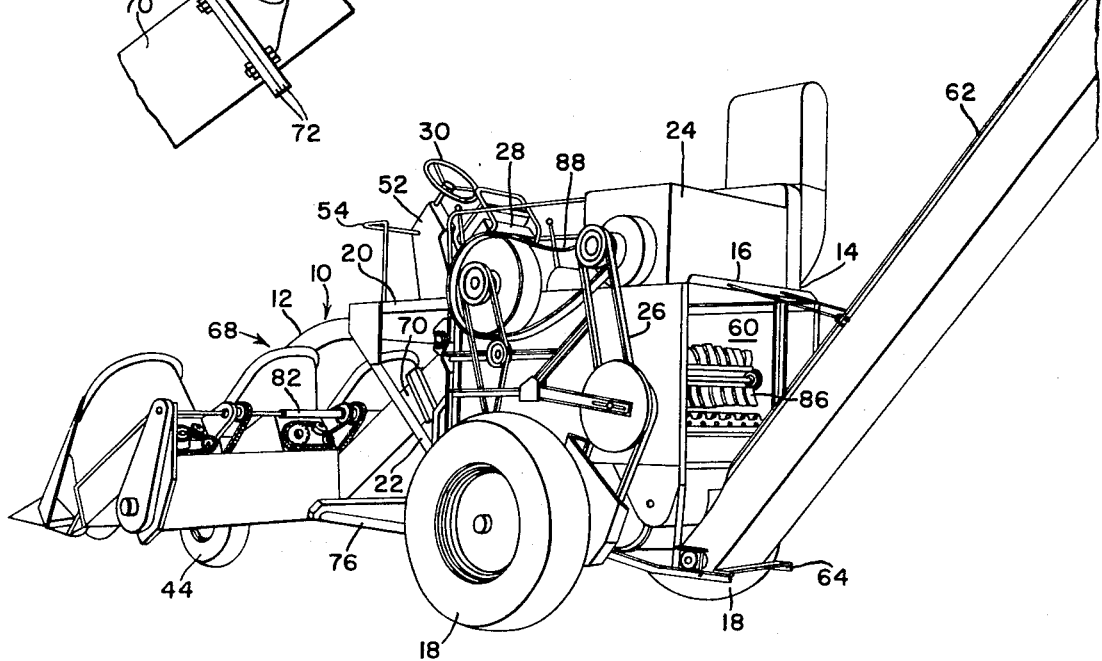
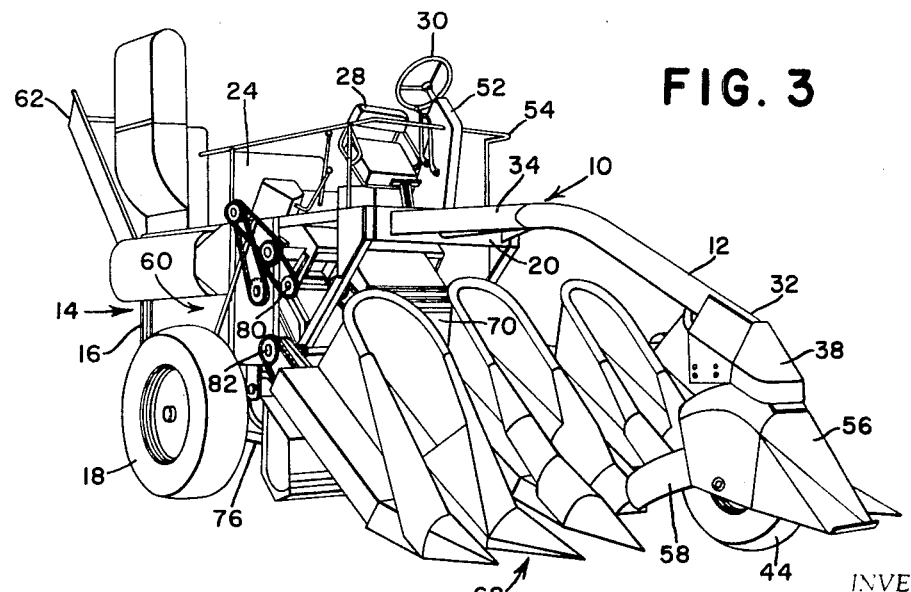

INVENTOR.
F. D. L. JONES

3,673,775

SELF-PROPELLED AGRICULTURAL MACHINE

BACKGROUND OF THE INVENTION

Many types of self-propelled agricultural machines are known, probably the most popular of which is the combine; although, it is not uncommon to find self-propelled forage harvesters, balers, hay cubers, corn pickers, etc. Other than the combine, most of these rely on tractors or some vehicle having tractor characteristics, and, also, many depend upon adhering to fundamentals of the harvester, with the result that many compromises have had to be accepted such as inefficiency, poor weight distribution, instability, high costs and so forth.

SUMMARY OF THE INVENTION

According to the present invention, the mobile frame has few of the characteristics of a tractor or tractor-like vehicle and its components are readily adaptable to existing harvester configurations and/or such configurations can be easily altered to accommodate the mobile frame. The elongated "-gooseneck" frame portion enables the "underslung" mounting of a variety of tools, implements, cutting and gathering mechanisms, pick-ups and the like ahead of any companion crop-handling unit that is likewise underslung in the rear section between the traction wheels. The elevated part of the rear section carries the power plant as well as the operator's station, giving the operator an adequate view of the field ahead.

Whichever type of crop collecting, harvesting, gathering, picking, etc. means is used is connected to its companion crop-handling unit and is additionally supported from the rear section so that a major part of the weight of the machine is carried by the traction or rear section, improving traction, flotation and steerability. The companion units are detachably interconnected to provide ready mounting and dismounting of the front unit from the rear unit and also to achieve ease of interchangeability, as where the rear unit is a threshing and separating unit that can be used with a forward grain header or with a corn picker unit having multiple row units.

The length of the frame enables the use of a longer wheelbase and thus leads to improvement in fore-and-aft stability, because none of the implement or harvesting machinery involve over-hanging parts tending to tip the machine about a transverse axis as would be the case, for example, in a combine where the relatively heavy platform extends substantially ahead of the front traction wheels.

BRIEF DESCRIPTION OF THE DRAWINGS

FIG. 2 is a perspective, as seen from the left rear, of the machine as a complete operative unit, a multi-row corn head being used as the front implement.

FIG. 3 is a perspective similar to FIG. 1, but on a smaller scale and showing the machine of FIG. 2.

FIG. 7 is a fragmentary view of a typical detachable connection between the front and rear harvester or implement units.

DESCRIPTION OF A PREFERRED EMBODIMENT

Figure 1:
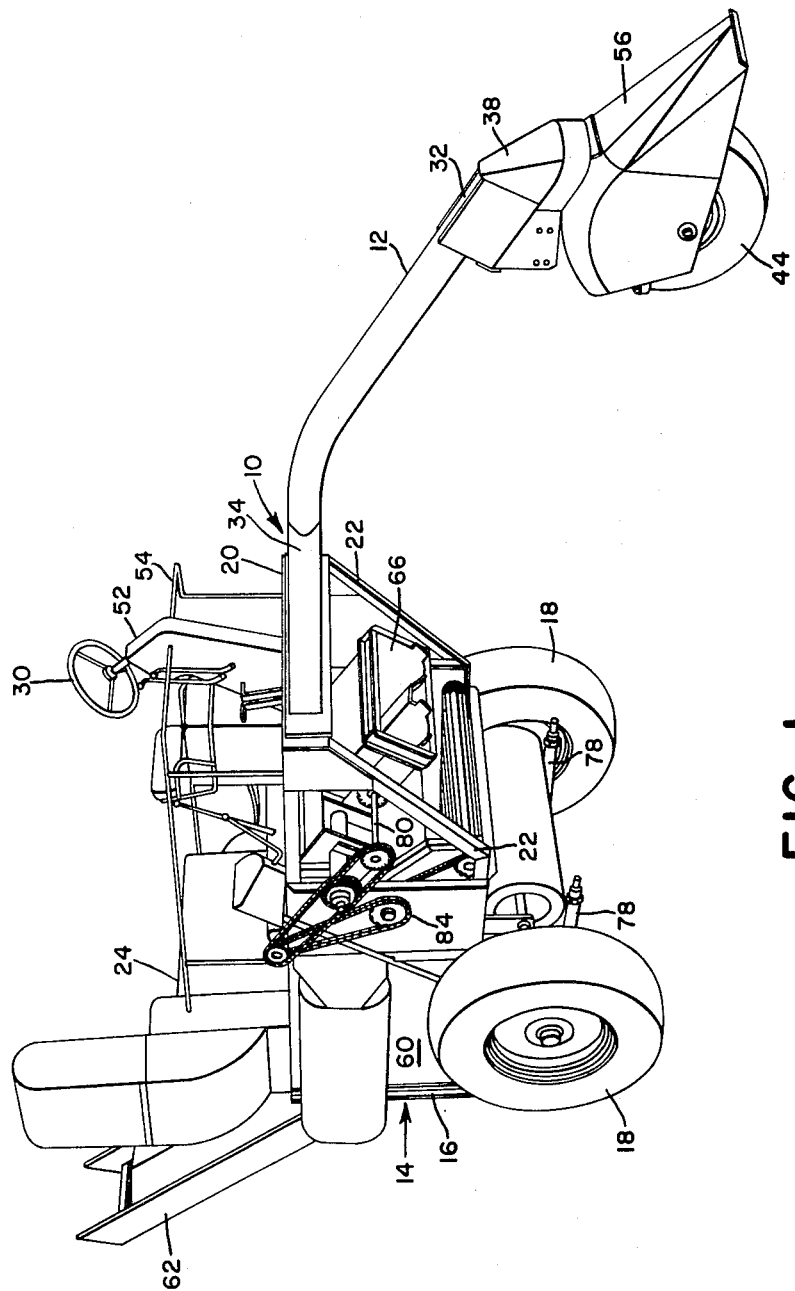
FIG. 1 is a perspective of the basic machine without a front harvesting, etc. unit.

A mobile frame 10 comprises front and rear rigidly united frame sections 12 and 14, respectively, the latter being of boxlike construction by the use of rigidly interconnected frame parts 16 and supported by and between a pair of transversely spaced apart traction wheels 18. An upper portion of the rear section provides an elevated platform 20 that extends forwardly of the rear wheels 18 and is supported additionally by braces 22. The rear part of the platform 20 carries a power source 24, here a typical internal combustion engine. The traction wheel drive, indicated generally at 26, is not unlike that of the conventional self-propelled combine, and the wheels are interconnected by a transmission and differential unit such as may also be found in combines. The platform has an operator's station including a seat 28 and steering wheel 30, as well as other controls of typical nature.

Figure 4:
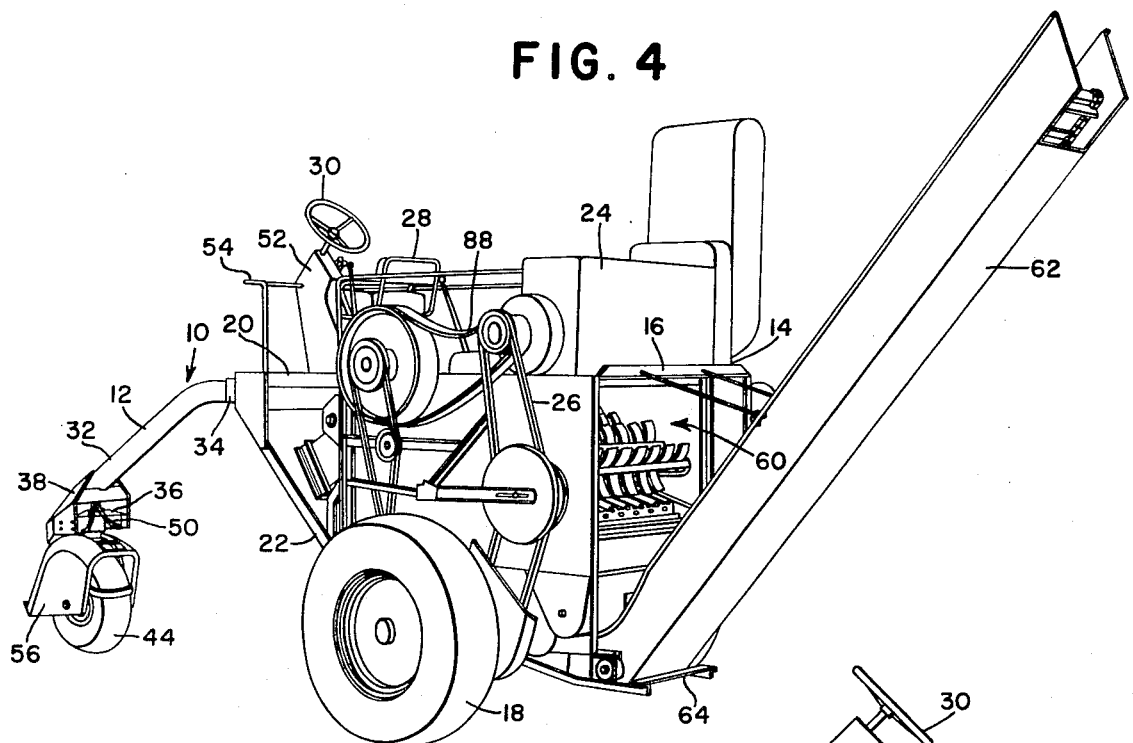
FIG. 4 is a reduced perspective as seen from the viewpoint of FIG. 2 but showing the machine of FIG. 1.
Figure 6:
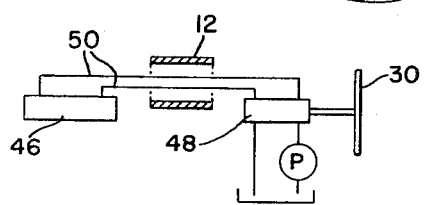
FIG. 6 is a schematic view of one form of hydraulic steering means that can be used.
Figure 5:
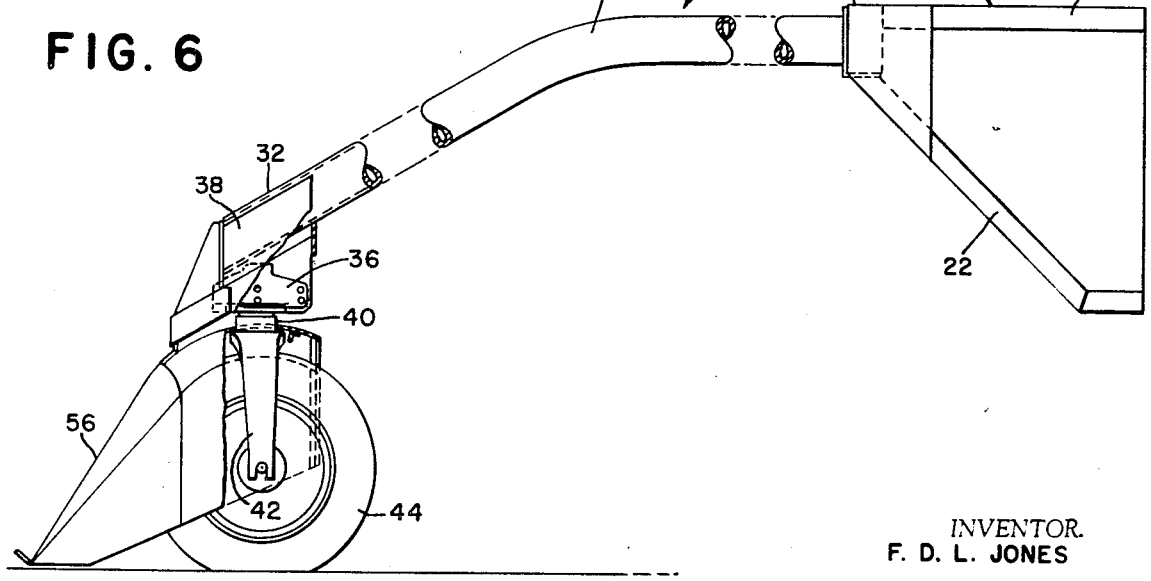
FIG. 5 is an enlarged fragmentary view, partly in section, illustrating the front frame section and its steerable wheel means.

The elongated front frame section 12 extends from its elevated rear end to a lower front end 32 and is essentially hollow, being preferably a structural member of tubular cross-section, joined as by welding to the rear section and braced in that area at 34 and including a front housing 36 enclosed by shielding 38. The housing journals an upright turnable shaft 40 from which depends a typical fork 42 for journaling a front wheel 44, thus providing steerable front wheel means. The housing also contains a hydraulic steering motor 46 (FIG. 6) for turning the shaft 40, as in any conventional tractor. A pump P, driven from the power source 24, supplies fluid under pressure under control of a valve 48 operated by the steering wheel 30. As shown in FIG. 6, the valve-to-motor lines, as at 50, extend through the hollow member 12. See also FIG. 4. The valve 48 is located within a steering wheel support housing 52, and handrails 54 are connected between the housing 52 and the platform 20.

In the construction shown, the longitudinal centerline of the machine is midway between the traction wheels 18, and the operator's station, front member or beam 12 and steerable wheel means also lie on this centerline, making the machine symmetrical from right to left. Also in the present case, the front wheel means is provided with a crop shield 56, and, as seen in FIG. 3, this is equipped with flexible deflector wings 58, peculiar to the particular illustrated instance of a corn harvester as the basic equipment. With other equipment and in other crops, the shield and deflectors could be omitted or replaced by other elements suitable to the occasion.

Because of the nature of the rear frame section 14, that is, the elevated platform 20 and structural members 16, it readily adapts itself to the mounting of a crop-handling means 60, here a corn husking mechanism of any suitable type. This means could as easily be the threshing and separating mechanism for a combining operation, a chopper and blower for a forage harvester, bale-handling means or any of the many types of crop-handling equipment known or being developed. The significant feature is that such a means is mounted on, and may even form a structural part of, the rear section 14. The crop handled or treated by the unit 60 is ultimately conveyed by an elevator 62 to a towed wagon or the like (not shown) connectable to a wagon hitch 64.

The unit or means 60 has a forwardly facing, somewhat elevated crop inlet 66 for receiving material from a front unit 68, here a multi-row corn head attachment of any known type which functions as a crop-collecting or gathering means for picking several rows of corn, here four, and conveying the ears centrally and rearwardly for transfer through a rear outlet 70 (FIGS. 2 and 3) to the inlet 66 of the rear unit 60. As will be appreciated from the structure of the inlet 66 as a rectangular housing, the outlet 70 is of mating construction and any suitable detachable connection may be used between the two, such as upper elements comprising flanges 72 and bolts and nuts 74 (FIG. 7). Additional, lower support elements 76 extend from a lower part of the rear section 14 to a lower part of the unit 68 and include hydraulic cylinders 78, as best seen in FIG. 1, for extending and retracting the elements 76 lengthwise to adjust the unit 68 vertically about an axis coincident with an upper transverse shaft 80. See FIGS. 1 and 3.

The shaft 80 is part of drive means that may be regarded as common to the units 60 and 68 and that furnishes input to drive means for the front unit 68, which of course has the usual gathering chains, snapping rolls, etc., not shown because they are so well known. Part of this drive means is visible at 82 in FIGS. 2 and 3. The drivable means for and within the rear unit 60 is seen at least in part at 84 in FIG. 1 and at 86 in FIG. 2. The drive from the power means 24 is seen at 88 in FIGS. 2 and 4. The internal connections need not be described, since they are commonplace.

In the case, as illustrated, of a multi-row corn head attachment, the front wheel, being centered, travels between the two inner row units, which would also be the case were the unit 68 a forage harvester or other row crop unit or tool. The crop transfer means 66–70 is also centered, adding to the symmetry referred to above. Such location would be similarly significant in instances of combining, for example. The disconnectability of the elements 72–74 and 76–78 enables easy mounting and dismounting as well as providing for interchangeability of front units while using the same rear unit, as in combining corn or grain. Because the front frame or gooseneck is largely a frame for adding length and stability and not for carrying weight, it can be made of light-weight and inexpensive tubing. Its shape permits the front agricultural unit, of whatever type, to be mounted below it. As will be obvious from the disposition of the inlet 66 in FIG. 1, many types of collecting means could be employed to deliver to a similarly located inlet on a substituted rear unit.

I claim:

1. A self-propelled agricultural machine, comprising: a mobile frame having front and rear sections; said rear section including a rigid frame structure having a pair of transversely spaced apart drive wheels and an elevated portion above the level of the tops of the drive wheels; said front section including an elongated structural member having a rear end forming a rigid juncture with the elevated portion and disposed substantially centrally between the wheels and extending forwardly and downwardly in arch-like fashion to a front end spaced substantially forwardly of the rear section, and steerable wheel means supporting said front end; crop-handling means carried by the rear section below said elevated portion and having a forwardly facing crop-receiving inlet below and substantially centered on the juncture of the rear end of the structural member with the rear section; crop-collecting means disposed beneath and arched over by the structural member and having a rear crop-delivery outlet communicating with said inlet means mounting the crop-collecting unit on the frame; a power source carried on said elevated portion of the rear section and drivingly connected to the drive wheels; and an operator's station carried on said elevated portion and including steering means operatively connected to steerable wheel means.

2. The invention defined in claim 1, in which the crop-collecting means includes at least a pair of spaced apart, side-by-side row crop units, one at each side of the member.

3. The invention defined in claim 1 in which the means carrying the crop-collecting means includes supporting elements interconnecting the inlet and outlet and additional supporting elements connected between the crop-collecting means and the rear section.

4. The invention defined in claim 3 in which the additional elements are below the first-mentioned elements.

5. The invention defined in claim 3 in which both elements are disconnectable to enable detachment of the crop-collecting means.

6. The invention defined in claim 1 in which the operator's station is carried by the rear section at a forward part thereof and the power means is disposed rearwardly of the operator's station.

7. The invention defined in claim 1, including drivable mechanisms in both the crop-handling means and the crop-collecting means and drive connections between said mechanisms and the power source.

8. The invention defined in claim 1 in which the elongated member is essentially hollow and the steering means includes a steering member on the operator's station and force-transmitting connection means between the steering member and the steerable wheel means and housed at least in part in said elongated member.

9. A self-propelled agricultural machine, comprising: a mobile frame having front and rear section; said rear section including a rigid frame structure having a pair of transversely spaced apart drive wheels and an elevated portion above the level of the tops of the drive wheels; said front section including an elongated structural member having a rear end forming a rigid juncture with the elevated portion and disposed substantially centrally between the wheels and extending forwardly and downwardly in arch-like fashion to a front end spaced substantially forwardly of the rear section, and steerable wheel means supporting said front end; crop-handling means carried by the rear section below said elevated portion and having a forwardly facing crop-receiving inlet below and substantially centered on the juncture of the rear end of the structural member with the rear section; a power source carried on said elevated portion of the rear section and drivingly connected to the drive wheels; and an operator's station carried on said elevated portion and including steering means operatively connected to steerable wheel means.

* * * * *